US007584595B2

(12) United States Patent
Marggi et al.

(10) Patent No.: US 7,584,595 B2
(45) Date of Patent: Sep. 8, 2009

(54) BIFOLD RAKE

(75) Inventors: Jeff Marggi, Oregon, WI (US); William Bassett, Brodhead, WI (US)

(73) Assignee: Kuhn North America, Inc., Brodhead, WI (US)

( * ) Notice: Subject to any disclaimer, the term of this patent is extended or adjusted under 35 U.S.C. 154(b) by 210 days.

(21) Appl. No.: 11/620,888

(22) Filed: Jan. 8, 2007

(65) Prior Publication Data

US 2008/0163602 A1    Jul. 10, 2008

(51) Int. Cl.
*A01D 76/00* (2006.01)

(52) U.S. Cl. .......................................... 56/385; 56/375

(58) Field of Classification Search .................... 56/228, 56/365, 367, 370, 375–381, 384, 385, 390, 56/396, 397

See application file for complete search history.

(56) References Cited

U.S. PATENT DOCUMENTS

| 5,493,853 A | * | 2/1996 | Tonutti | ......................... 56/377 |
| 5,752,375 A | * | 5/1998 | Tonutti | ......................... 56/365 |
| 5,899,055 A | * | 5/1999 | Rowse et al. | ................... 56/377 |
| 2006/0185342 A1 | | 8/2006 | Hruska et al. | |

* cited by examiner

*Primary Examiner*—Thomas B Will
*Assistant Examiner*—Mai T Nguyen
(74) *Attorney, Agent, or Firm*—Oblon, Spivak, McClelland, Maier & Neustadt, P.C.

(57) ABSTRACT

A rake apparatus includes a tongue with a hitch, front rake arm positioners each pivotally connected to a forward portion of the tongue assembly, rear rake arm positioners pivotally connected to a rear portion of the tongue assembly, and rake arm assemblies including a rake arm assembly front end and a rake arm assembly back end. The rake arm assemblies are pivotally connected to one of the front rake arm positioners and one of the rear rake arm positioners. Distances between the rake arm assembly front ends and the tongue are greater when the rake arm assemblies are in an operating position than when they are in a traveling position. The rake arm assembly back end of each of the rake arm assemblies is positioned farther in the forward direction when the rake arm assemblies are in the operating position than when the rake arm assemblies are in the traveling position.

23 Claims, 7 Drawing Sheets

BIFOLD RAKE

BACKGROUND OF THE INVENTION

1. Field of the Invention

This invention relates to an agricultural rake device, specifically a Bifold or V-rake type. In one non-limiting embodiment, the Bifold rake is used for raking hay.

2. Description of the Related Art

Agricultural rakes are used to form windrows from cut crops, such as, for example, hay, straw and grasses. It is a typical agricultural process to cut these crops, rake or merge them into windrows where additional drying may occur, collect and store the crops, and subsequently feed the crops to livestock.

Modern power equipment for raking cut forage employs rotating tined wheels and particularly banks of rotating tined wheels that are moved through a field of cut forage to form windrows. These banks of wheel rakes can be quite wide to reduce both the time and number of passes required to rake a field. Because of the wide widths employed by rakes, they typically will have pivot points on each rake arm in order to fold to a narrower width for transport. Wide rakes thereby offer a potential time and cost savings to agriculture and enhance the raking process to best utilize favorable weather conditions, or to maximize the capacity utilization of the next piece of hay raking equipment.

The wide rakes require longer rake arms to support the banks of tined wheels required for efficient raking. Each rake arm includes a number of tined rake wheels which contact the ground in a working position, and serve to rake crop material into a center windrow while being pulled through a field of cut hay or alfalfa. These long rake arms can be heavy and cumbersome both in operation and in transport. While in operation, the bifold rake arms are normally spread in a "V" shape with the open end of the "V" facing forward in the direction of travel. When in transport, the machine must be configured to be much narrower. Therefore, the rake arms must pivot and/or fold.

Several different folding arm configurations are conventionally used to extend and retract the rake arms between a working position and a transport position. One common folding arm configuration can be referred to as a 'T' arrangement, where a fixed rear frame assembly is attached to the tongue at the rear of the v-rake opposite the hitch and positioned perpendicular to the direction of travel. This rear frame assembly sometimes telescopes to create a wider stance during operation, but is fixed at a 90-degree angle to the tongue. The rake arms are pivotally mounted on the ends of the fixed rear frame assembly, and can pivot between the working position and the transport position. A pair of transport wheels is also mounted at or near the ends of the rear frame assembly, and these wheels do not significantly change position when the rake arms are extended. The width of the rear frame assembly and thus the transport wheels is usually close to the maximum transport width, to provide stability for the equipment.

A second folding arm configuration is a "Y" arrangement and is commonly used on rakes where the rake arms are only attached to the frame in one place. This arrangement includes a pair of rear arms, which are pivotally attached to the rear end of the tongue at one end, and pivotally attached to the rake arms at the other end. The rear arms are both typically angled rearward from the tongue, forming a "Y" shape. When the rear arms are moved to a working position, the rake arm pivots, moves primarily outward, and slightly forward. Because the rake arms are only attached at this one pivot point, the angle of the rake arms must be controlled by another means, usually a hydraulic cylinder.

Certain systems with wheels at the rear of the equipment during operation such as in the "T" arrangement can render the unit long and cumbersome to steer and turn in the field in some circumstances. Some manufacturers incorporate a telescoping tongue to help bring these rear wheels slightly forward during operation, but this is a compromise of strength on the tongue member.

Certain "T" configurations have a wheel width that changes little between working and transport positions since the wheels are located very near the rear pivot point. This fixed wheel width may be a disadvantage in a working position when it is more desirable for the rear wheels to be as wide as possible while raking in the field.

The "T" configuration is also typically fairly low to the ground, limiting the distance for the crop to flow under. While the rear frame assembly can be raised, the taller configuration is usually a compromise of strength between the tongue and the supporting wheels.

In the "Y" arrangement, the transport wheels can typically be spread wider during operation. However, they usually do not move substantially forward. Therefore, the rake can be long and cumbersome to steer and turn in the field. The rake arms are usually separately controlled with hydraulic cylinders and attached to the arms at only one pivot point. Because of the stress put on this one pivot point, the overall size and weight of the frame and arm members is usually substantially bigger than in rakes that attach to the rake arms in at least two places.

SUMMARY OF THE INVENTION

Accordingly, one objective of the present invention is to provide a rake which addresses at least some of the problems associated with known devices for raking cut crops. Moreover, depending on the embodiment of the invention, one or more of the capabilities set forth below may be achieved.

For example, one non-limiting embodiment of the present invention can provide a rake with transport wheels that pivot outward and substantially forward when in an operating position to provide a shorter turning radius in the field. This is accomplished by using a pair of rake arm positioners in the front, to spread the rake arms wide during operation. It also includes another pair of rake arm positioners in the rear, to allow the rake arms to pivot forward when in operating position. Because of the pivoting rear positioners, the rear wheels can be positioned considerably more forward when in an operating position than can be done with conventional designs.

One example of the invention includes a rake apparatus configured to be pulled in a forward direction and includes a tongue assembly including a hitch. The rake apparatus further includes first and second front rake arm positioners each pivotally connected to a forward portion of the tongue assembly proximate to the hitch. The rake apparatus further includes first and second rear rake arm positioners pivotally connected to a rear portion of the tongue assembly farther from the hitch than the forward portion of the tongue assembly, and first and second rake arm assemblies each including a rake arm assembly front end and a rake arm assembly back end. The rake arm assemblies are pivotally connected to one of the front rake arm positioners and one of the rear rake arm positioners such that distances between each of the rake arm assembly front ends and the tongue assembly are greater when the rake arm assemblies are in an operating position than when the rake arm assemblies are in a traveling position.

Further, the rake arm assembly back end of each of the first and second rake arm assemblies is positioned farther in the forward direction when the rake arm assemblies are in the operating position than when the rake arm assemblies are in the traveling position.

Another example of the invention includes a rake apparatus configured to be pulled in a forward direction. The rake apparatus includes a tongue assembly with a hitch. The rake apparatus further includes first and second front rake arm positioners each pivotally connected to a forward portion of the tongue assembly proximate to the hitch. The rake apparatus further includes first and second rear rake arm positioners pivotally connected to a rear portion of the tongue assembly farther from the hitch than the forward portion of the tongue assembly. Additionally, the rake apparatus includes first and second rake arm assemblies each including a rake arm assembly front end and a rake arm assembly back end, each rake arm assembly being pivotally connected to one of the front rake arm positioners and one of the rear rake arm positioners. An angle, which opens toward the hitch, between each of the first and second rake arm assemblies and the tongue is larger when the rake arm assemblies are in an operating position than when the rake arm assemblies are in a traveling position. The rake arm assembly back end of each of the first and second rake arm assemblies is positioned farther in the forward direction when the rake arm assemblies are in the operating position than when the rake arm assemblies are in the traveling position.

Yet another example of the invention includes a rake apparatus configured to be pulled in a forward direction. The rake apparatus includes a tongue assembly including a hitch. The rake apparatus further includes first and second front rake arm positioners each pivotally connected to a forward portion of the tongue assembly proximate to the hitch. The rake apparatus further includes first and second rear rake arm positioners pivotally connected to a rear portion of the tongue assembly farther from the hitch than the forward portion of the tongue assembly. The rake apparatus further includes first and second rake arm assemblies pivotally connected to one of the front rake arm positioners and one of the rear rake arm positioners at an angle, which opens toward the hitch. The angle is between each of the first and second rake arm assemblies and the tongue. The rake apparatus includes means for making the angle larger when the rake arm assemblies are in an operating position than when the rake arm assemblies are in a traveling position. The rake apparatus further includes means for moving the rake arm assembly back end of each of the first and second rake arm assemblies relative to the hitch such that the rake arm assembly back end of each of the first and second rake arm assemblies is positioned farther in the forward direction when the rake arm assemblies are in the operating position than when the rake arm assemblies are in the traveling position.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

Figure 1:
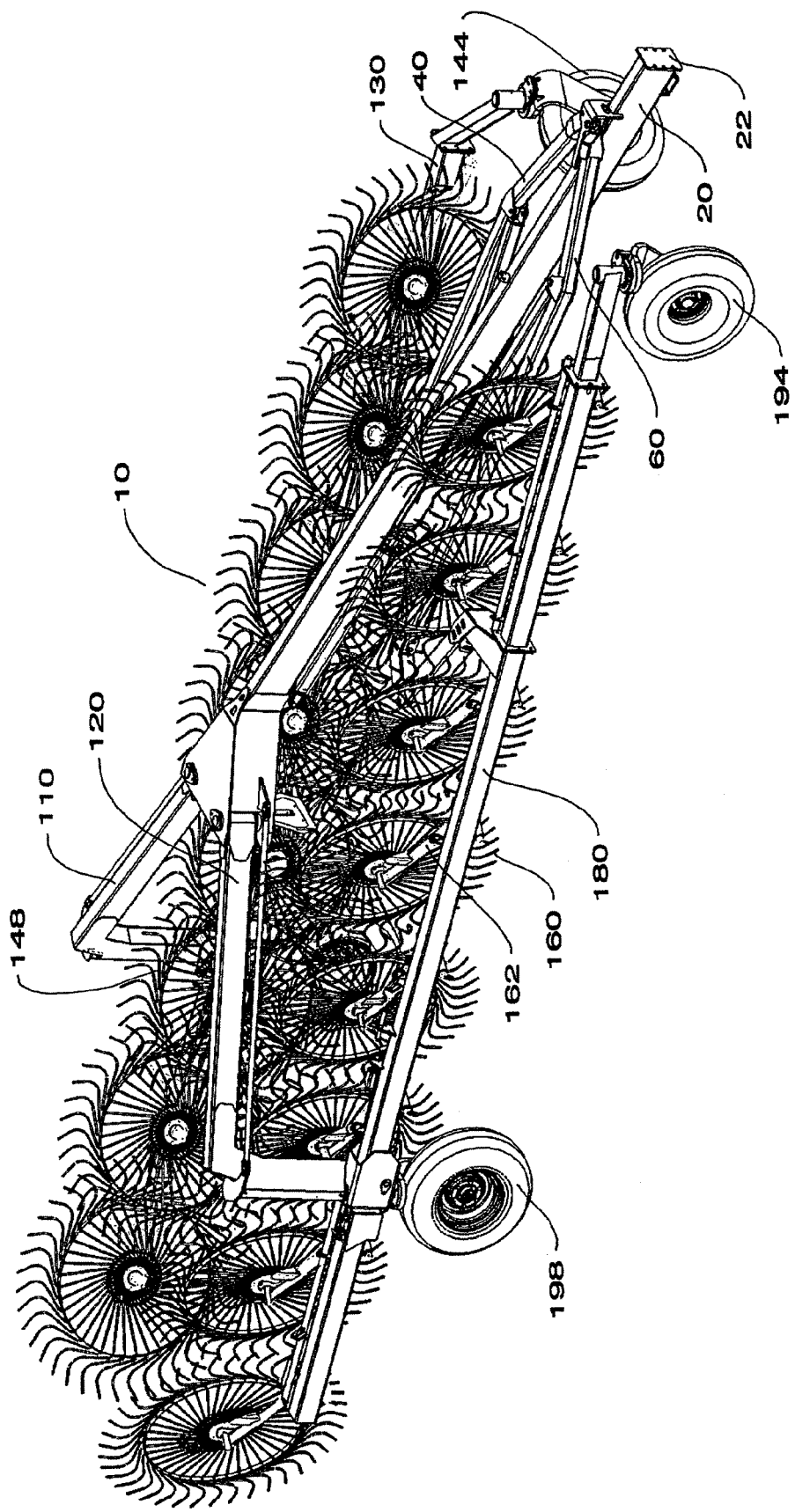
FIG. 1 is an isometric view of one embodiment of the Bifold Rake.

With reference to FIG. 1, one non-limiting embodiment of the inventive rake apparatus is generally designated by the reference number 10. The rake apparatus 10 includes a tongue assembly 20, which includes a hitch 22 at a forward end (note that the hitch need not be connected at the very end of the tongue assembly, but can be positioned somewhat toward the middle). The rake apparatus is configured to be pulled forward by connection with the hitch 22. As viewed facing forward, toward the direction of travel, a left rake arm assembly 130 and a right rake arm assembly 180 each include a plurality of tined rake wheels 160 attached to the rake arm assemblies 130 and 180 by a plurality of rake wheel arms 162. The left rake arm assembly 130 also includes rake arm wheels 144 and 148, and the right rake arm assembly 180 includes rake arm wheels 194 and 198. The rake arm assemblies 130 and 180 are attached to the tongue 20 at the front by a left front rake arm positioner 40 and a right front rake arm positioner 60. The rake arm assemblies 130 and 180 are attached to the tongue 20 at the rear by a left rear rake arm positioner 110 and a right rear rake arm positioner 120.

Figure 2:
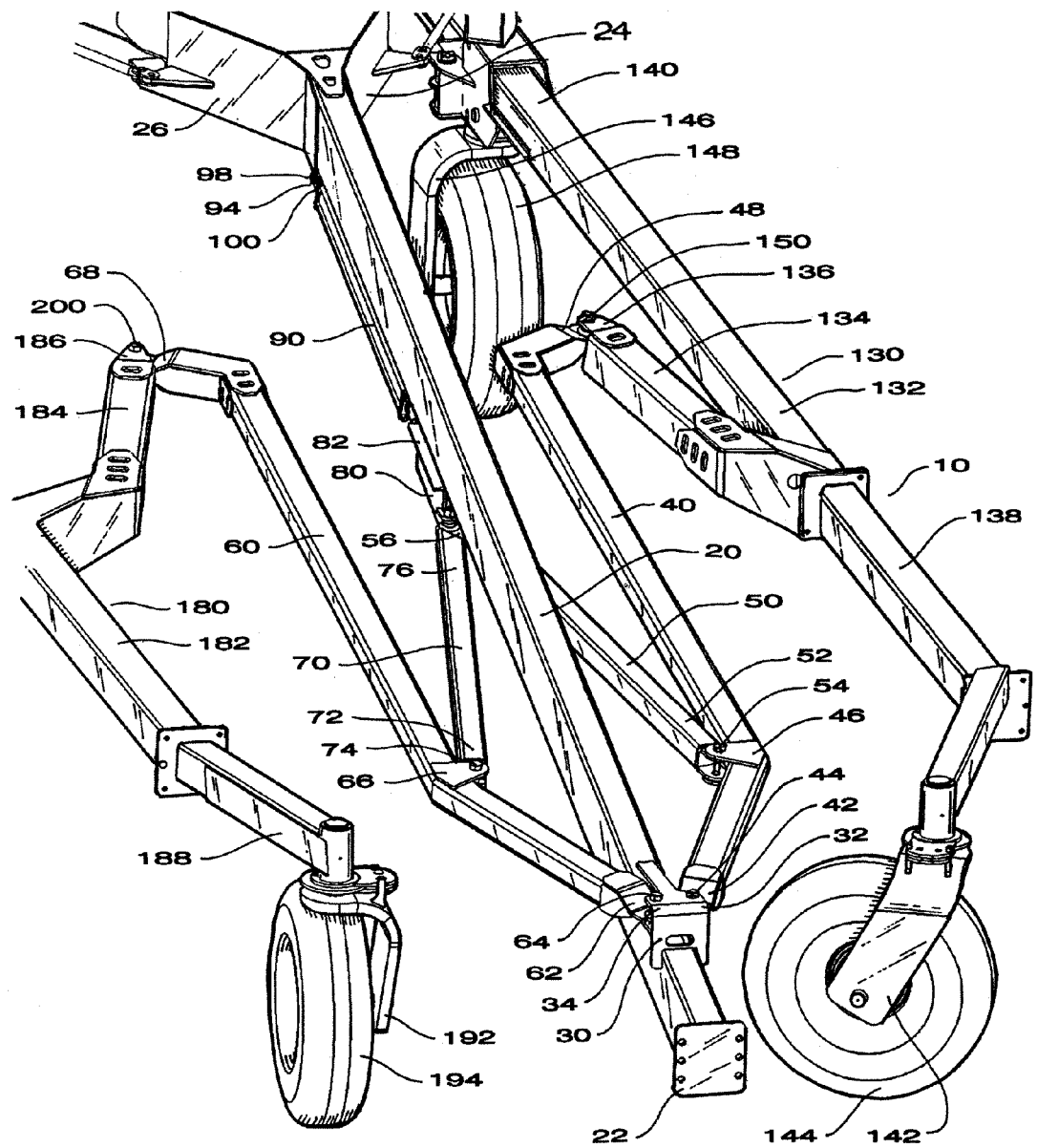
FIG. 2 is an isometric view of the front portion of the Bifold Rake shown in FIG. 1.
Figure 3:
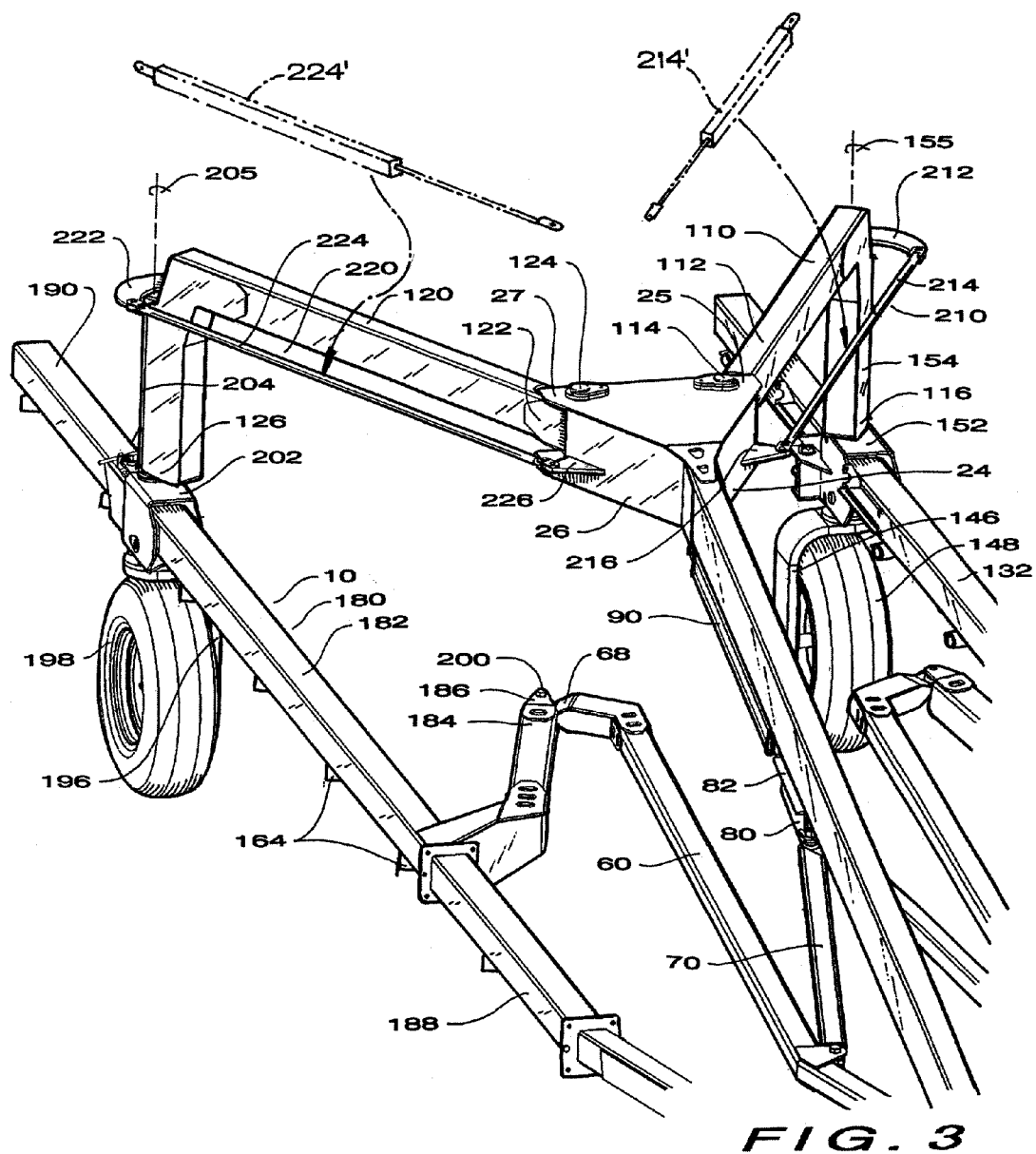
FIG. 3 is an isometric view of the rear portion of the Bifold rake shown in FIG. 1.

With reference to FIGS. 2 and 3, the rake apparatus 10 includes a tongue assembly 20, which typically includes a hitch 22 at the forward end, and a left wing 24 and a right wing 26 at the rear end. The left wing 24 includes a left wing pivot 25, and the right wing 26 includes a right wing pivot 27. Adjacent to the hitch 22 is a tongue pivot assembly 30 further including a left tongue pivot 32 and a right tongue pivot 34.

A left front rake arm positioner 40 includes a left front positioner pivot 42 which is attached to the left tongue pivot 32 by a left tongue pivot pin 44. The left front rake arm positioner 40 also includes a left middle positioner pivot 46 and a left rear positioner pivot 48.

A left pusharm 50 is located adjacent to the left front rake arm positioner 40, and includes a left pusharm pivot 52 which connects the left pusharm 50 with the left front rake arm positioner 40 at the left middle positioner pivot 46. A left pusharm pin 54 connects the left pusharm pivot 52 to the left middle positioner pivot 46. The left pusharm 50 also includes a left sled pusharm pivot 56 at the opposite end from the left pusharm pivot 52. One non-limiting variation of this configuration replaces the left pusharm 50 with a hydraulic cylinder, attaching it to the left middle positioner pivot 46 on one end, and to a point attached to the tongue 20 on the opposite end. This variation allows movement of the rake arm positioner 40 independently from the right side components.

A right front rake arm positioner 60 includes a right front positioner pivot 62 which is attached to the right tongue pivot 34 by a right tongue pivot pin 64. The right front rake arm positioner 60 also includes a right middle positioner pivot 66 and a right rear positioner pivot 68.

Figure 6:
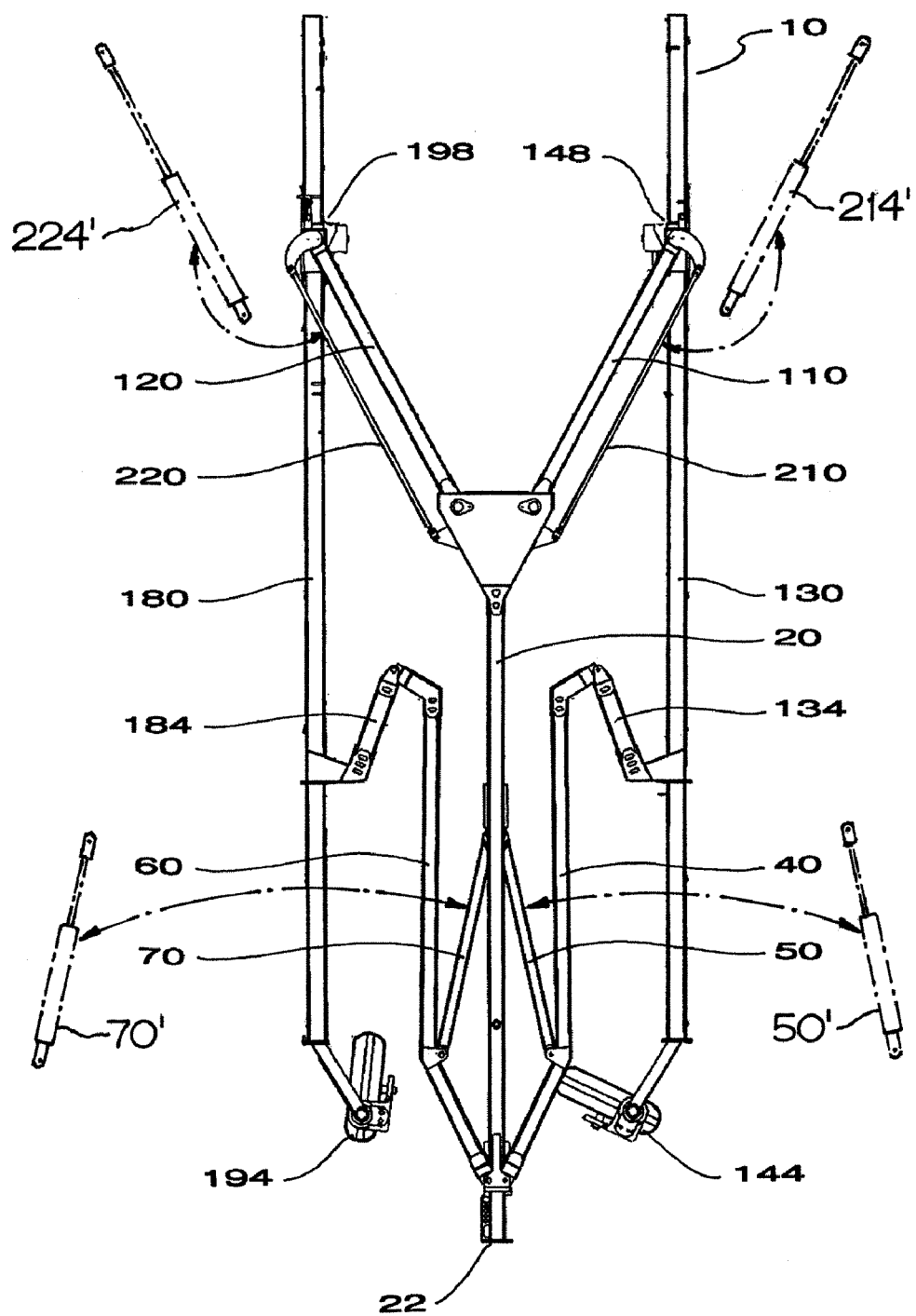
FIG. 6 is a top view of the Bifold Rake shown in FIG. 1 in a transport configuration or "traveling position.

A right pusharm 70 is located adjacent to the right front rake arm positioner 60, and includes a right pusharm pivot 72 which connects the right pusharm 70 with the right front rake arm positioner 60 at the right middle positioner pivot 66. A right pusharm pin 74 connects the right pusharm pivot 72 to the right middle positioner pivot 66. The right pusharm 70 also includes a right sled pusharm pivot 76 at the opposite end from the right pusharm pivot 72. One non-limiting variation of this configuration is to replace the right pusharm 70 with a hydraulic cylinder 70', attaching it to the right middle positioner pivot 66 on one end, and to a rigid point attached to the tongue 20 on the opposite end. One example of the hydraulic cylinder 70' used to replace the pusharm 70 is shown in FIG. 6. This variation would then allow movement of the rake arm positioner 60 independently of the left side components.

Figure 4:
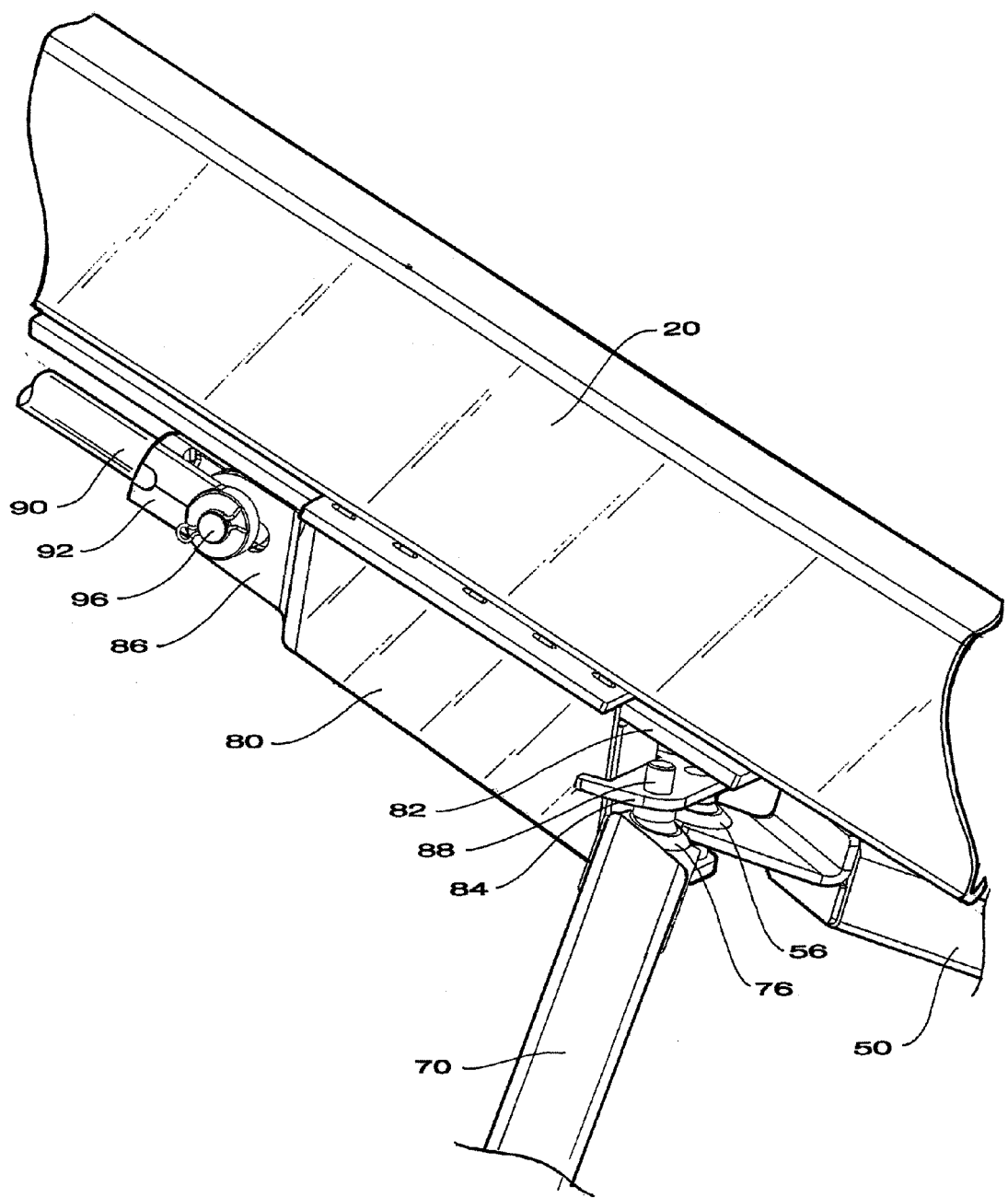
FIG. 4 is an isometric view of a sled assembly according to one non-limiting embodiment of the invention.

A sled assembly 80 is typically slidably attached underneath the tongue 20 by a sled guide 82. In other embodiments, the sled guide may be above or wrapped around the tongue 20. The sled guide 82 is preferably a "T" shaped rail, but could alternatively be other structural shapes which are capable of retaining the sled assembly 80 while allowing it to slide easily along the sled guide 82. As shown in FIG. 4, the sled assembly 80 includes a sled pivot 84 at the front end and a sled cylinder mount 86 at the rear end. At least one sled pivot pin 88 attaches the sled pivot 84 to the left sled pusharm pivot 56 and the right sled pusharm pivot 76. A sled cylinder 90 is typically located behind the sled assembly 80, and the sled cylinder 90 includes a front cylinder clevis 92 and a rear cylinder clevis 94. The front cylinder clevis 92 is attached to the sled cylinder mount 86 by a front cylinder pin 96. The rear cylinder clevis 94 is attached to a tongue cylinder mount 98 by a rear cylinder pin 100. The tongue cylinder mount 98 is typically rigidly attached underneath the tongue assembly 20 and just behind the sled cylinder 90. In another non-limiting embodiment, the cylinder 90 is located in front of the sled assembly 80 and pulls the ends of the right and left push arms 70, 50 forward toward the hitch 22 to move the rake arm assemblies 180 and 130 into an operating position. Whether located in front of the sled assembly 80 or behind it, the cylinder 90 may be positioned above, beside, or below the tongue 20.

As shown in FIG. 3, at the rear end of the tongue assembly 20 adjacent to the left wing 24 is a left rear rake arm positioner 110. The left rear rake arm positioner 110 includes a left inner positioner pivot 112, which is pivotally attached to the left wing pivot 25 by a left wing pin 114. The left rear rake arm positioner 110 also includes a left outer positioner pivot 116 which is located at the opposite end from the left inner positioner pivot 112.

At the rear end of the tongue assembly 20 adjacent to the right wing 26 is a right rear rake arm positioner 120. The right rear rake arm positioner 120 includes a right inner positioner pivot 122, which is pivotally attached to the right wing pivot 27 by a right wing pin 124. The right rear rake arm positioner 120 also includes a right outer positioner pivot 126 which is located at the opposite end from the right inner positioner pivot 122.

As shown in FIG. 2, a left rake arm assembly 130 includes a left rake arm 132. A left rake arm extension 134 is rigidly attached to the left rake arm 132 and includes a left rake arm extension pivot 136. A left extension pin 150 connects the left rake arm extension pivot 136 to the left rear positioner pivot 48. The left rake arm 132 also includes a left rake arm front 138 and a left rake arm rear 140. At least one left rake arm wheel mount assembly 142 is mounted on the left rake arm 132, and includes a left rake arm wheel 144. In some applications, the left rake arm wheel mount assembly 142 is located adjacent the left rake arm front 138, and a further left rake arm wheel mount assembly 146 and further left rake arm wheel 148 are located adjacent the left rake arm rear 140.

As shown in FIG. 3, a left rear rake arm pivot 152 is attached to the left rake arm 132 and is connected to the left outer positioner pivot 116 by a left vertical spindle 154. The left vertical spindle 154 includes an axis of rotation 155 which is relatively vertical. The top of the left vertical spindle 154 is attached to a left bell crank assembly 210, which includes a left steering arm 212, a left pushrod 214, and a left pushrod mount 216. The bottom of the left vertical spindle 154 is attached to the further left rake arm wheel mount assembly 146. The function of the left bell crank assembly 210 is to retain the position of the further left rake arm wheel 148 in parallel alignment to the tongue 20 during folding and unfolding of the rake arm assemblies 130 and 180. Alternatively, the bell crank assembly 210 can be omitted, and the left rake arm wheel can be mounted on a caster (not shown). The same arrangement may be made for the right rake arm wheel 198. In an alternate embodiment, the left pushrod 214 is replaced with a hydraulic cylinder, and the left rake arm wheel mount assembly 146 can be controlled independently of the left rake arm positioner 110, which then helps to open and close the left rake arm assembly 130. In another non-limiting embodiment, the cylinder 90 is not used, and two cylinders 214' and 224' are used in place of the pushrods 214 and 224. An example of a hydraulic cylinder used in this manner is shown in FIGS. 3 and 6. In this embodiment, forward motion of the rake apparatus 10 can be used to cause the right and left rake arm wheels 198, 148 to pull the right and left rake arm assemblies away from the tongue 20 and into an operating position.

A right rake arm assembly 180 includes a right rake arm 182. A right rake arm extension 184 is rigidly attached to the right rake arm 182, and includes a right rake arm extension pivot 186. A right extension pin 200 connects the right rake arm extension pivot 186 to the right rear positioner pivot 68. The right rake arm 182 also includes a right rake arm front 188 and a right rake arm rear 190. At least one right rake arm wheel mount assembly 192 is mounted on the right rake arm 182, and includes a right rake arm wheel 194. In some applications, the right rake arm wheel mount assembly 192 is located adjacent the right rake arm front 188, and a further right rake arm wheel mount assembly 196 and further right rake arm wheel 198 are located adjacent the right rake arm rear 190.

A right rear rake arm pivot 202 is attached to the right rake arm 182, and is connected to the right outer positioner pivot 126 by a right vertical spindle 204. The right vertical spindle 204 includes an axis of rotation 205 which is relatively vertical. The top of the right vertical spindle 204 is attached to a right bell crank assembly 220, which includes a right steering arm 222, a right pushrod 224, and a right pushrod mount 226. The bottom of the right vertical spindle 204 is attached to the further right rake arm wheel mount assembly 196. The function of the right bell crank assembly 220 is to retain the position of the further right rake arm wheel 198 in parallel alignment to the tongue 20 during folding and unfolding of the rake arm assemblies 130 and 180. In an alternate embodiment, the right pushrod 224 is replaced with a hydraulic cylinder, and the right rake arm wheel mount assembly 196 can be controlled independently of the right rake arm positioner 120. This alternate embodiment enhances the ability to open and close the right rake arm assembly 180.

A plurality of tined rake wheels 160 (shown in FIG. 1) are attached to the rake arm assemblies 130 and 180 by a plurality of tined rake wheels arms 162, which pivot on tined rake wheel mounts 164.

FIG. 4 shows a portion of the tongue 20. A sled assembly 80 is slidably attached underneath the tongue by a sled guide 82. The sled guide 82 is preferably a "T" shaped rail, but could alternatively be other structural shapes which are capable of retaining the sled assembly 80 while allowing it to slide or roll easily along the sled guide 82. The sled assembly 80 typically includes a sled pivot 84 at the front end and a sled cylinder mount 86 at the rear end. The sled pivot 84 can include one or more sled pivot pins 88. At least one sled pivot pin 88 attaches the sled pivot 84 to the left sled pusharm pivot 56 of the left pusharm 50 and to the right sled pusharm pivot 76 of the right pusharm 70. A sled cylinder 90 is located behind the sled assembly 80, and the sled cylinder 90 includes a front cylinder clevis 92. The front cylinder clevis 92 is attached to the sled cylinder mount 86 by a front cylinder pin 96.

Figure 5:
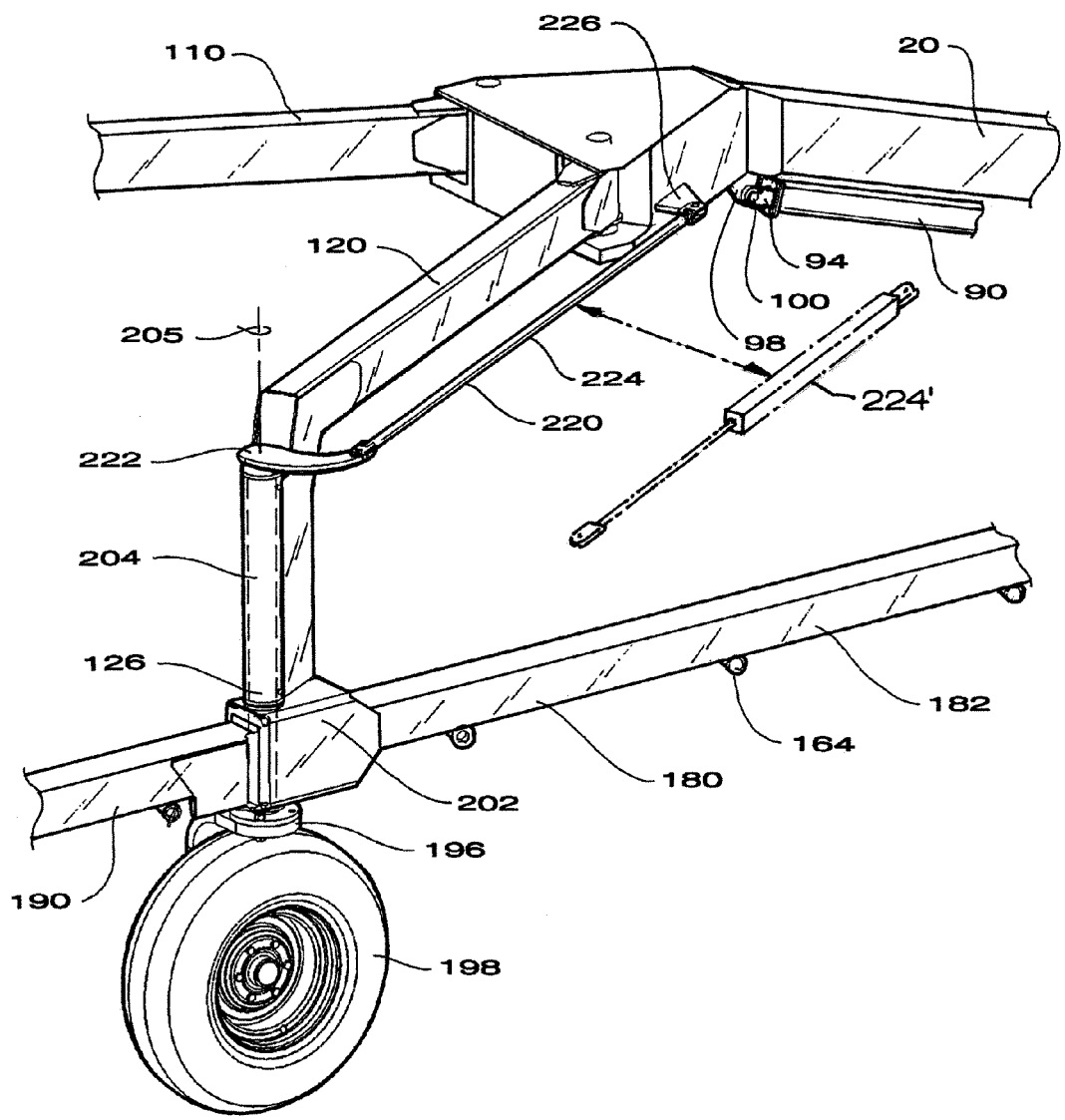
FIG. 5 is an isometric view of a rear rake arm positioner according to one non-limiting embodiment of the invention.

FIG. 5 shows a portion of the tongue 20, including a left rake arm positioner 110 and a right rake arm positioner 120. A tongue cylinder mount 98 is rigidly attached underneath the tongue assembly 20 behind the sled cylinder 90. The rear cylinder clevis 94 is attached to a tongue cylinder mount 98 by a rear cylinder pin 100. Other configurations are possible. For example, the cylinder 90 can be attached above the tongue 20 or beside it.

A right bell crank assembly 220 is shown which is used to position the further right rake arm wheel 198 in parallel alignment to the tongue 20 during folding and unfolding of the right rake arm assembly 180. It is understood that the left bell crank assembly 210 is typically a mirror image arrangement on the opposite side. A right vertical spindle 204 is shown with an axis of rotation 205 which is relatively vertical. The right vertical spindle 204 passes through the right outer positioner pivot 126 and the right rake arm pivot 202 before being attached at the base to the further right rake arm wheel mount assembly 196 and further right rake arm wheel 198. The right vertical spindle 204 is attached at the top to a right steering arm 222, which then connects to a right pushrod 224. The right pushrod 224 is attached to the right pushrod mount 226.

Figure 7:
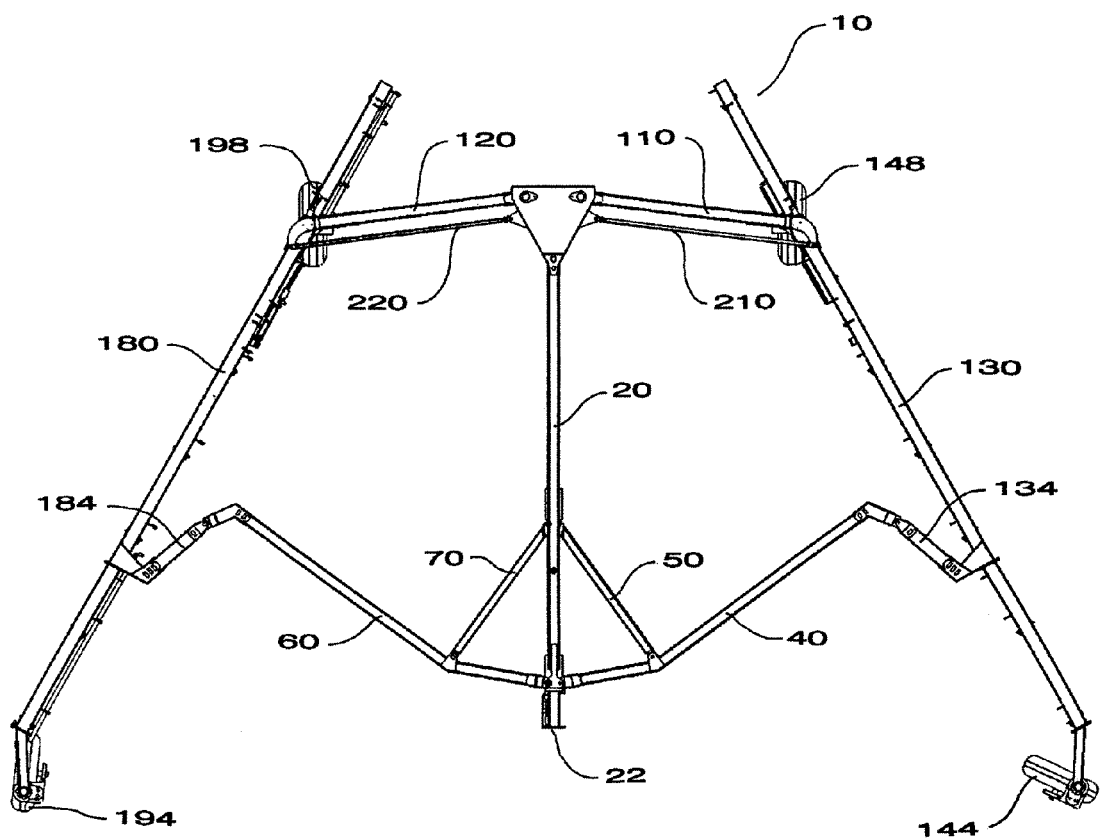
" and FIG. 7 is a top view of the Bifold Rake shown in FIG. 1 in a working position or "operating position."

With reference to FIGS. 6 and 7, the rake apparatus 10 includes a hitch 22 attached to the tongue 20. A left front rake arm positioner 40 and a right front rake arm positioner 60 are pivotally connected to the front end of the tongue 20. A left rear rake arm positioner 110 and a right rear rake arm positioner 120 are pivotally connected to the rear end of the tongue 20. The front rake arm positioners 40 and 60 are pivotally connected to a left rake arm extension 134 and a right rake arm extension 184, which are rigidly connected to a left rake arm assembly 130 and a right rake arm assembly 180 respectively. The rear rake arm positioners 110 and 120 are also pivotally connected to the rake arm assemblies 130 and 180. A left rake arm wheel 144 and a further left rake arm wheel 148 are attached to the left rake arm assembly 130. A right rake arm wheel 194 and further right rake arm wheel are attached to the right rake arm assembly 180. The rake apparatus 10 is made to fold and unfold using a left pusharm 50 and a right pusharm 70, which are pivotally connected to the front rake arm positioners 40 and 60. The further rake arm wheels 148 and 198 are maintained in parallel alignment to the tongue 20 using a left bellcrank assembly 210 and a right bellcrank assembly 220 attached between the tongue 20 and the rear rake arm positioners 110 and 120.

As shown in FIGS. 6 and 7, the rake apparatus 10 is narrower when the rake arm assemblies 130, 180 are in the traveling position (FIG. 6) than when the rake arm assemblies are in the operating position (FIG. 7).

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least some of the stated objectives.

The invention claimed is:

1. A rake apparatus configured to be pulled in a forward direction, comprising:
   a tongue assembly including a hitch;
   first and second front rake arm positioners each pivotally connected to a forward portion of the tongue assembly proximate to the hitch via first pivot points;
   first and second rear rake arm positioners pivotally connected to a rear portion of the tongue assembly farther from the hitch than the forward portion of the tongue assembly via second pivot points; and
   first and second rake arm assemblies each including a rake arm assembly front end and a rake arm assembly back end, each rake arm assembly being pivotally connected to one of the front rake arm positioners and one of the rear rake arm positioners
   such that distances between each of the rake arm assembly front ends and the tongue assembly are greater when the front and rear rake arm assemblies are in an operating position than when the rake arm assemblies are in a traveling position and
   such that the rake arm assembly back end of each of the first and second rake arm assemblies is positioned farther in the forward direction when the rake arm assemblies are in the operating position than when the rake arm assemblies are in the traveling position,
   wherein the first and second rear rake arm positioners are at least partially disposed rearward of the second pivot points while the rake arm assemblies are in the traveling position.

2. The rake apparatus according to claim 1, wherein the first and second rake arm assemblies each include:
   at least one rake arm wheel; and
   a plurality of tined rake wheels.

3. The rake apparatus according to claim 2, wherein a distance between a bottom of the tongue assembly and an axis of rotation of the at least one rake arm wheel is greater than a distance between a bottom of each of the first and second rake arm assemblies and the axis of rotation of the at least one rake arm wheel.

4. The rake apparatus according to claim 1, wherein a front wheel and rear wheel are mounted on each of the first and second rake arm assemblies.

5. The rake apparatus according to claim 4, wherein the rear wheel on each of the first and second rake arm assemblies is held in alignment by a bell crank assembly so as to roll parallel to the tongue in both the operating position and the traveling position.

6. The rake apparatus according to claim 5, wherein the bell crank assembly includes:
   a vertical spindle connected to the rear wheel;
   a steering arm connected to the vertical spindle;
   a pushrod connected to the steering arm; and
   a pushrod mount connected to one end of the pushrod opposite the steering arm.

7. The rake apparatus according to claim 1, wherein the tongue assembly is a rigid non-telescoping member extending at least from the first pivot points to the second pivot points.

8. The rake apparatus according to claim 1, wherein the first and second rake arm assemblies are configured to move in response to movement of a single cylinder coupled to a sled.

9. The rake apparatus according to claim 8, wherein the single cylinder is coupled to the tongue assembly and is configured to extend and retract along an axis of the tongue extending from the forward portion toward the rear portion of the tongue assembly.

10. The rake apparatus according to claim 8, wherein the sled is configured to move toward the hitch and away from the hitch in response to movement of the single cylinder, and the sled is mounted beneath the tongue assembly and moves relative to the tongue assembly.

11. The rake apparatus according to claim 1, wherein the rake arm assemblies are configured to move in response to movement of first and second cylinders, the first and second cylinders are attached to the first and second front rake arm positioners, respectively, and to the tongue assembly.

12. The rake apparatus according to claim 1, wherein the rake arm assemblies are configured to move in response to movement of first and second cylinders, and the first and second cylinders are attached to the first and second rear rake arm positioners, respectively, and to the tongue assembly.

13. The rake apparatus according to claim 1, wherein the first and second front rake arm positioners each form an angle with the tongue, and the angle is larger when the front rake arm positioners are in an operating position than when the front rake arm positioners are in a traveling position.

14. The rake apparatus according to claim 1, wherein each rake arm assembly is pivotally connected to one of the front rake arm positioners through a rake arm extension.

15. A rake apparatus configured to be pulled in a forward direction comprising:
    a tongue assembly including a hitch;
    first and second front rake arm positioners each pivotally connected to a forward portion of the tongue assembly proximate to the hitch via first pivot points;
    first and second rear rake arm positioners pivotally connected to a rear portion of the tongue assembly farther from the hitch than the forward portion of the tongue assembly via second pivot points; and
    first and second rake arm assemblies each including a rake arm assembly front end and a rake arm assembly back end, each rake arm assembly being pivotally connected to one of the front rake arm positioners and one of the rear rake arm positioners
        such that an angle, which opens toward the hitch, between each of the first and second rake arm assemblies and the tongue is larger when the rake arm assemblies are in an operating position than when the rake arm assemblies are in a traveling position and
        such that the rake arm assembly back end of each of the rake arm assemblies is positioned farther in the forward direction when the rake arm assemblies are in the operating position than when the rake arm assemblies are in the traveling position,
    wherein the first and second rear rake arm positioners are at least partially disposed rearward of the second pivot points while the rake arm assemblies are in the traveling position.

16. The rake apparatus according to claim 15, wherein the first and second rake arm assemblies each include:
    at least one rake arm wheel; and
    a plurality of tined rake wheels.

17. The rake apparatus according to claim 16, wherein a distance between a bottom of the tongue assembly and an axis of rotation of the at least one rake arm wheel is greater than a distance between a bottom of each of the first and second rake arm assemblies and the axis of rotation of the at least one rake arm wheel.

18. The rake apparatus according to claim 15, wherein a front and rear wheel are mounted on each of the first and second rake arm assemblies.

19. The rake apparatus according to claim 18, wherein the rear wheel on each of the first and second rake arm assemblies is held in alignment by a bell crank assembly so as to roll parallel to the tongue in both the operating position and the traveling position.

20. A rake apparatus configured to be pulled in a forward direction comprising:
    a tongue assembly including a hitch;
    first and second front rake arm positioners each pivotally connected to a forward portion of the tongue assembly proximate to the hitch via first pivot points;
    first and second rear rake arm positioners pivotally connected to a rear portion of the tongue assembly farther from the hitch than the forward portion of the tongue assembly via second pivot points;
    first and second rake arm assemblies, each rake arm assembly being pivotally connected to one of the front rake arm positioners and one of the rear rake arm positioners at an angle, which opens toward the hitch, between each of the first and second rake arm assemblies and the tongue;
    means for making the angle larger when the rake arm assemblies are in an operating position than when the rake arm assemblies are in a traveling position; and
    means for moving the rake arm assembly back end of each of the first and second rake arm assemblies relative to the hitch such that the rake arm assembly back end of each of the first and second rake arm assemblies is positioned farther in the forward direction when the rake arm assemblies are in the operating position than when the rake arm assemblies are in the traveling position,
    wherein the first and second rear rake arm positioners are at least partially disposed rearward of the second pivot points while the rake arm assemblies are in the traveling position.

21. The rake apparatus according to claim 1, wherein the first and second rear rake arm positioners are configured to pivot forward to change from the traveling position to the operating position.

22. The rake apparatus according to claim 1, wherein at least one rake arm wheel is disposed on the rake arm assembly back end of each of the first and second rake arm assemblies, and the first and second rake arm assemblies are configured to move the at least one rake arm wheel away from the tongue assembly as the first and second rake arm assemblies move from the traveling position to the operating position.

23. The rake apparatus according to claim 1, wherein the rake arm assembly back end of each of the first and second rake arm assemblies is positioned farther in the forward direction, relative to the rear portion of the tongue assembly, when the rake arm assemblies are in the operating position than when the rake arm assemblies are in the traveling position.

* * * * *